(12) United States Patent
Wang et al.

(10) Patent No.: US 10,967,314 B2
(45) Date of Patent: Apr. 6, 2021

(54) WATER FLOATING OBJECT TREATMENT DEVICE FOR SEWAGE TREATMENT

(71) Applicant: Zhijun Wang, Shenzhen (CN)

(72) Inventors: Zhijun Wang, Shenzhen (CN); Jinmei Zhang, Shenzhen (CN)

(73) Assignee: Zhijun Wang, Shenzhen (CN)

( * ) Notice: Subject to any disclaimer, the term of this patent is extended or adjusted under 35 U.S.C. 154(b) by 0 days.

(21) Appl. No.: 16/655,243

(22) Filed: Oct. 17, 2019

(65) Prior Publication Data

US 2021/0060464 A1 Mar. 4, 2021

Related U.S. Application Data (63) Continuation of application No. PCT/CN2019/106481, filed on Sep. 18, 2019.

(30) Foreign Application Priority Data

Aug. 26, 2019 (CN) .......................... 201910791837.5

(51) Int. Cl.
| | |
|---|---|
| *B01D 35/26* | (2006.01) |
| *B01D 35/157* | (2006.01) |
| *C02F 1/00* | (2006.01) |
| *B01D 29/64* | (2006.01) |

(52) U.S. Cl.
CPC ......... *B01D 35/26* (2013.01); *B01D 29/6476* (2013.01); *B01D 35/1573* (2013.01); *C02F 1/001* (2013.01); *B01D 29/6415* (2013.01); *B01D 2201/0407* (2013.01); *C02F 2201/005* (2013.01); *C02F 2303/16* (2013.01)

(58) Field of Classification Search
CPC .......................... B01D 29/64; B01D 29/6407; B01D 29/6423; B01D 29/6484; B01D 29/6415; B01D 29/643; B01D 29/94; B01D 35/76; B01D 2201/0407; B01D 2201/188; B01D 35/26; B01D 35/1573; B01D 29/6476; C02F 1/001; C02F 2201/005; C02F 2303/16
See application file for complete search history.

(56) References Cited

U.S. PATENT DOCUMENTS

| | | | | |
|---|---|---|---|---|
| 1,987,142 | A * | 1/1935 | Clements, Jr. | ..... B01D 29/6484 |
| | | | | 210/136 |
| 9,327,218 | B2 * | 5/2016 | Linster | ................. B01D 29/665 |
| 2016/0339369 | A1 * | 11/2016 | Takahashi | .............. B01D 29/52 |

FOREIGN PATENT DOCUMENTS

FR        1110593 A * 2/1956 ......... B01D 29/6423

* cited by examiner

*Primary Examiner* — Terry K Cecil (57) ABSTRACT

The present disclosure provides a water floating object treatment device for sewage treatment, including water pump, motor, round box, butt joint hole, liquid inlet pipe, electric adjusting valve, pneumatic controller, round frame, slurry pump, round tube, three-blade long plate, fan-shaped scraping plate, fine screw rod, guide sliding rod, wire brush bristle, assembling hole, fine-hole filter plate, strip hole, round plate, air cylinder, rubber round block, fan-shaped hole, threaded hole, and sliding hole. The present disclosure is reasonable in design, and function of filtering water in a treatment tank is realized. By replacing and installing the fine-hole filter plates with different sizes of holes, different degrees of filter effects are achieved. Meanwhile, the filtered water can be injected into corresponding treatment tank.

10 Claims, 6 Drawing Sheets

WATER FLOATING OBJECT TREATMENT DEVICE FOR SEWAGE TREATMENT

TECHNICAL FIELD

The present disclosure relates to a water floating object treatment device, in particular to a water floating object treatment device for sewage treatment, which belongs to a technical field of sewage treatment application.

BACKGROUND

Urban domestic sewage discharge is a main pollution source of Chinese urban water. Domestic sewage treatment is heavy in current and future urban water-saving and urban water environment protection work. It is necessary to make construction of domestic sewage treatment facility as an important content of urban infrastructure and is an urgent matter.

Certain inconveniences exist in cleaning of floating impurities in sewage. Conventional filter structures are mostly single-layer filter structures, which have low filter efficiency and lack multi-faceted filter structures for performing high-efficiency filtration. Meanwhile, impurities are absorbed on the filter structures such that corresponding filter structures of the conventional filter structures are generally required to be disassembled to remove the impurities, operation of which is tedious and time-consuming. Moreover, the removed impurities are required to be transported by means of corresponding tools such as forklifts, and so on. If the impurities are not cleaned in time, the removed impurities are hardened together due to doped sludge, so that it causes difficulty in subsequent re-cleanings. Thus, the present disclosure provides a water floating object treatment device for sewage treatment to solve above problems.

SUMMARY

An object of the present disclosure is to provide a water floating object treatment device for sewage treatment to solve the above problem.

The water floating object treatment device for sewage treatment is reasonable in design, and function of filtering water in a treatment tank is realized. By replacing and installing fine-hole filter plates with different sizes of holes, different degrees of filter effects are achieved. Meanwhile, the filtered water can be injected into corresponding treatment tank.

The water floating object treatment device for sewage treatment is stable in operation and is beneficial to scrap and remove filter residue substances on surface of a water filter structure. So that a subsequent normal filter operation is ensured, and inconvenience of disassembling and cleaning filter materials is solved.

The water floating object treatment device for sewage treatment is compact in structure and realizes function of transporting the filter residue substances to corresponding stacking treatment position to be treated. So that an effect of conveniently processing the filter residue substances is realized.

BRIEF DESCRIPTION OF DRAWINGS

In order to clearly explain technical schemes of embodiments of the present disclosure or the prior art. The drawings are included to provide a further understanding of embodiments of the present disclosure. Obviously, the drawings in the following description are merely some of the embodiments of the present disclosure, and those skilled in the art are able to obtain other drawings according to the drawings without contributing any inventive labor.

DETAILED DESCRIPTION

In order to enable a purpose, characteristics and advantages of the present disclosure to be more obvious and easy to understand, a technical proposal in the embodiments of the present disclosure is clearly and completely described in the following with reference to the drawings and embodiments. Obviously, the described embodiments are only a part of the embodiments of the present disclosure, but not all embodiments. All other embodiments obtained by those skilled in the art based on the embodiments of the present disclosure without creative efforts are within the scope of the present disclosure.

A technical solution of the present disclosure is further described below with reference to the accompanying drawings and embodiments.

It should be understood in the description of the present disclosure that terms such as "upper", "lower", "top", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

Figure 1:
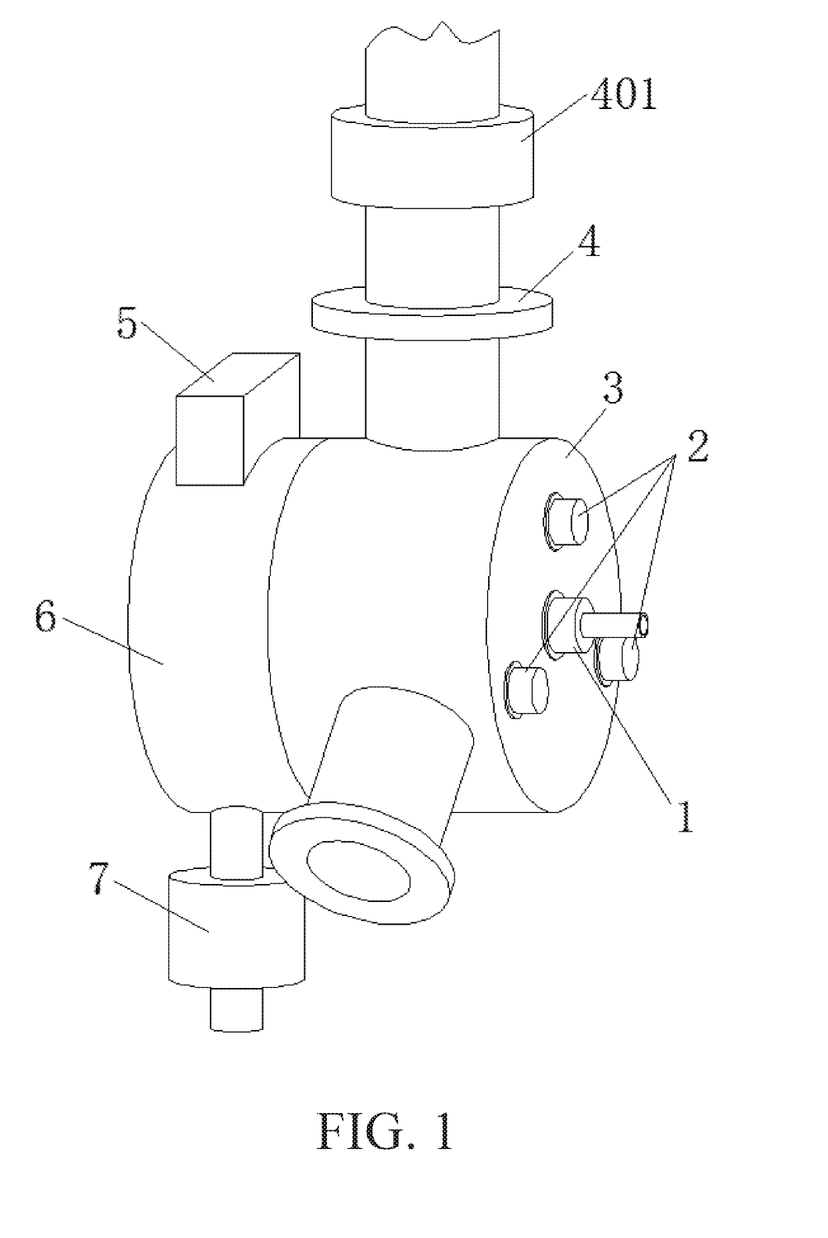
FIG. 1 is a perspective diagram of an integrated structure of a water floating object treatment device for sewage treatment of the present disclosure.
Figure 2:
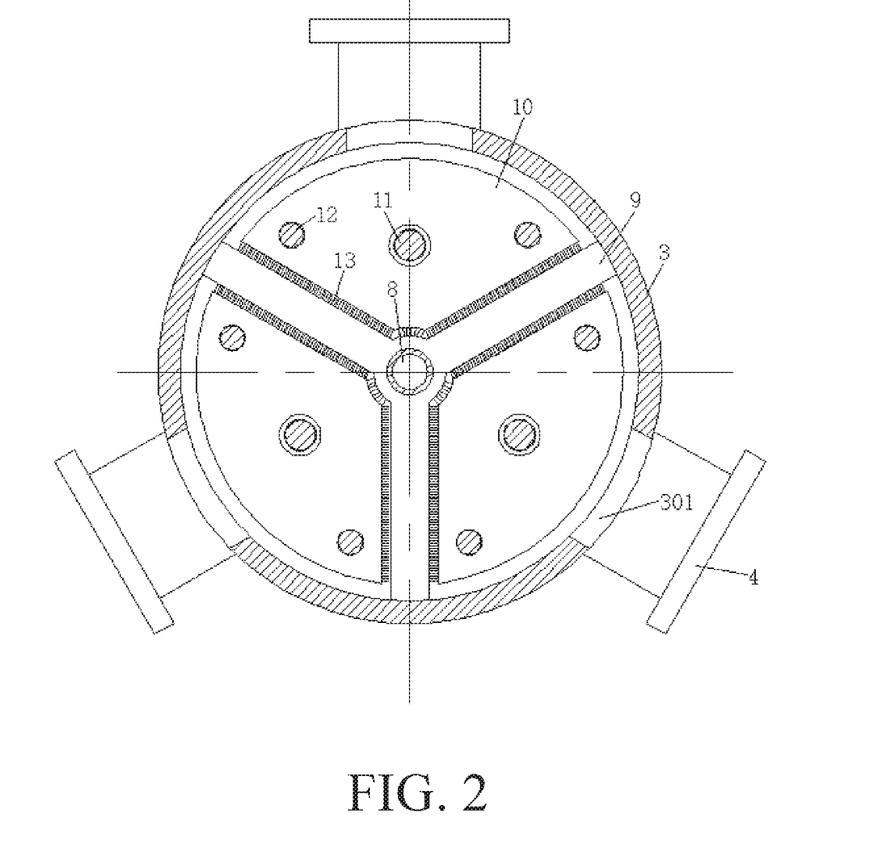
FIG. 2 is a schematic diagram of an internal structure of a round box of the water floating object treatment device for sewage treatment of the present disclosure.
Figure 3:
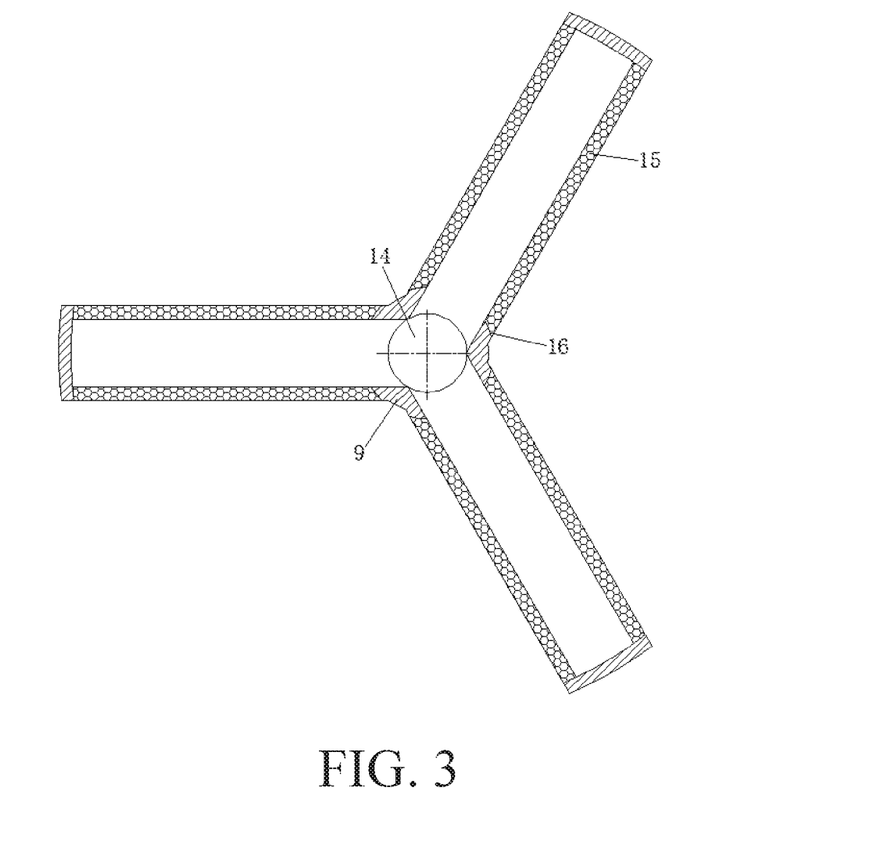
FIG. 3 is a schematic diagram of a structure of a three-blade long plate of the water floating object treatment device for sewage treatment of the present disclosure.
Figure 4:
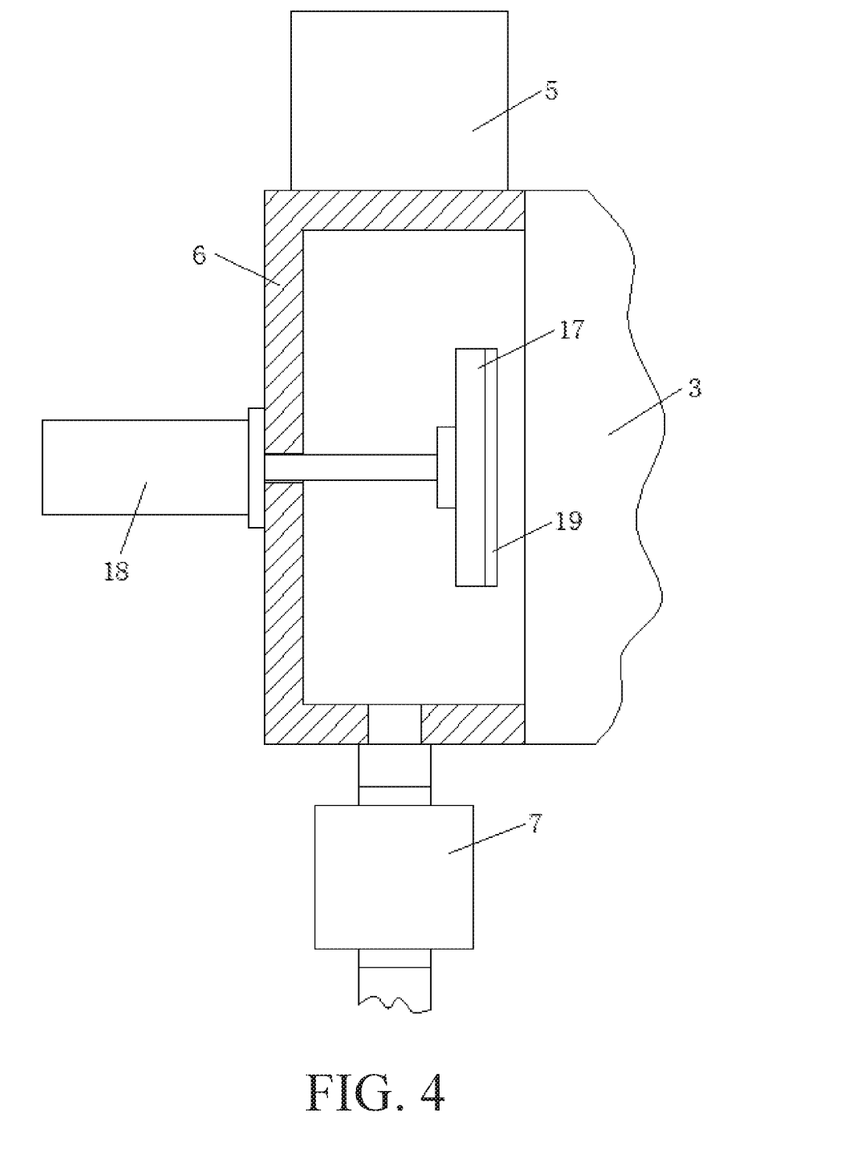
FIG. 4 is a schematic diagram of a discharging mechanism of the water floating object treatment device for sewage treatment of the present disclosure.
Figure 5:
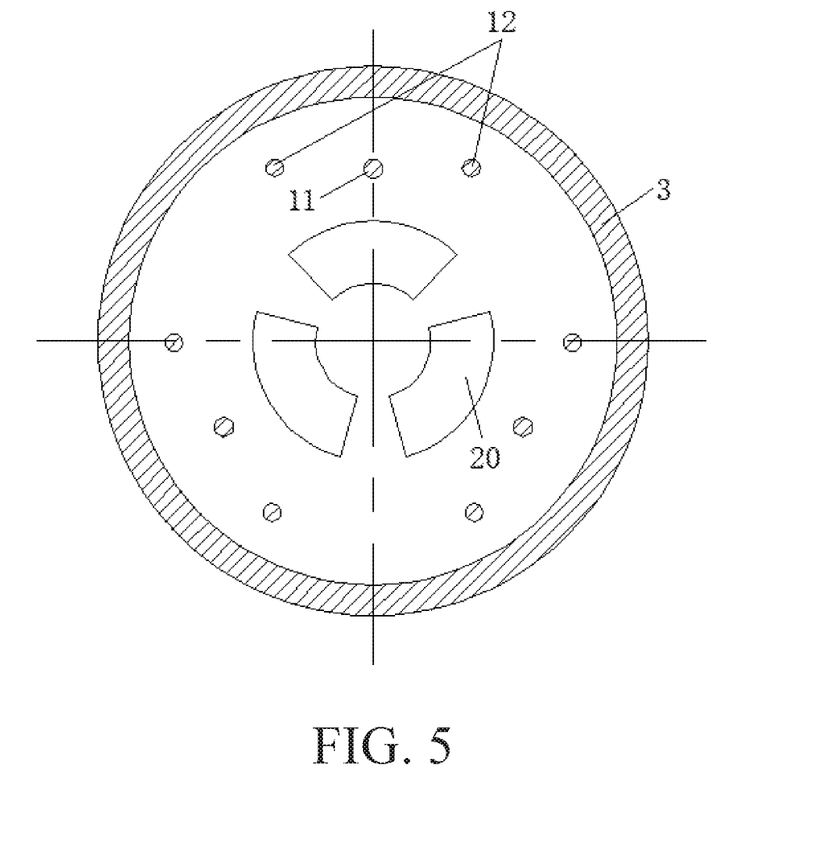
FIG. 5 is a schematic diagram of a structure of one end of the round box of the water floating object treatment device for sewage treatment of the present disclosure.
Figure 6:
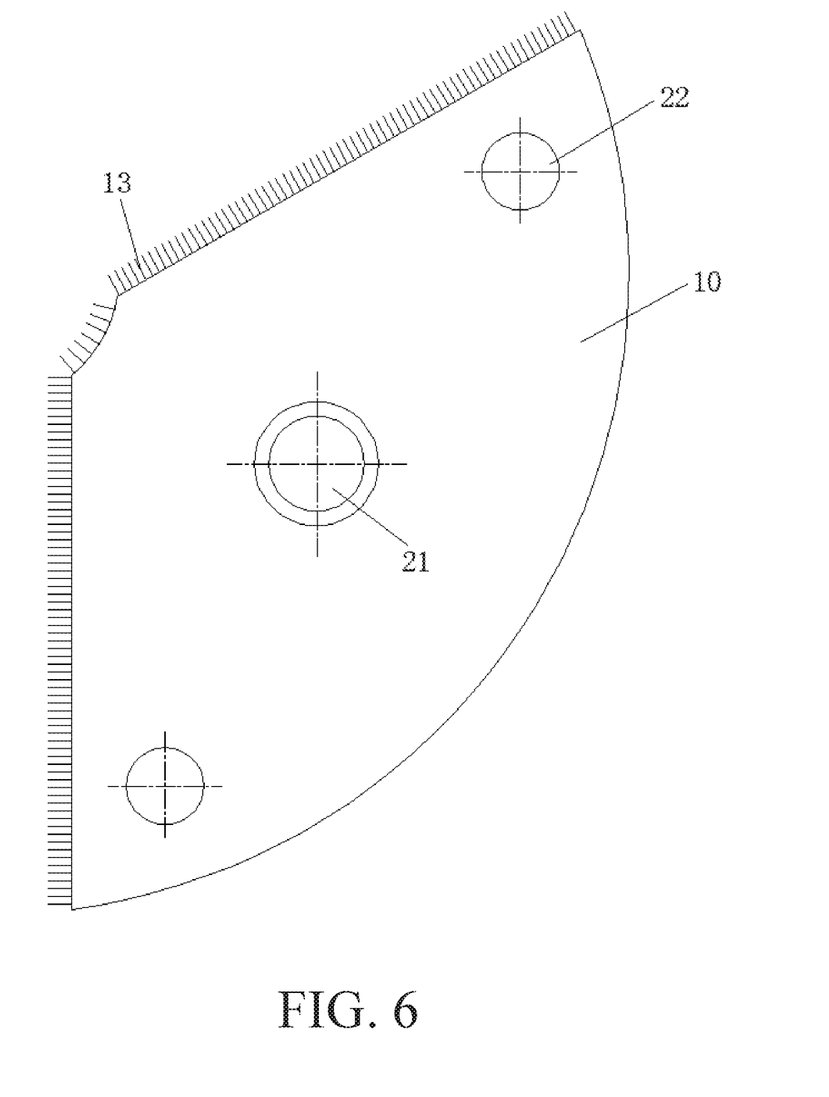
FIG. 6 is a schematic diagram of a structure of a fan-shaped scraping plate of the water floating object treatment device for sewage treatment of the present disclosure.

As shown in FIGS. 1-6, the present disclosure provides a water floating object treatment device for sewage treatment, including a round box 3, a suction filter mechanism, a scraping mechanism, and a discharging mechanism. Three ends of three liquid pipes 4 are annularly disposed on a middle of an annular surface of the round box 3 at equal intervals and communicated with the round box 3, and three fan-shaped holes 20 are annularly disposed on an end surface of one end of the round box 3 at equal intervals.

Furthermore, the suction filter mechanism includes a water pump 1 and a three-blade long plate 9. The water pump 1 is disposed on a middle of an end surface of another end of the round box 3, and one end of a round tube 8 is disposed on a water inlet of the water pump 1. The three-blade long plate 9 has a cavity structure, and an assembling hole 14 is disposed on a middle of one end inside the cavity structure. Strip holes 16 are disposed on two side surfaces of three supporting plates of the three-blade long plate 9, and fine-hole filter plates 15 are disposed inside the strip holes 16. The three-blade long plate 9 is disposed inside the round box 3.

Furthermore, the scraping mechanism includes fan-shaped scraping plates 10. Each fan-shaped scraping plate 10 is located in each fan-shaped space, and each fan-shaped space is formed between each two adjacent supporting plates of the three-blade long plate 9 and an inner annular wall of the round box 3. Moreover, fine screw rods 11 pass through each middle portion of fan-shaped scraping plates 10. Guide sliding rods 12 pass through fan-shaped scraping plates 10, and the guide sliding rods 12 are slidably disposed on two sides of the fan-shaped scraping plates 10. Steel wire brush bristles 13 are densely adhered to two side surfaces of each fan-shaped scraping plate 10. The fine screw rods 11 are rotatably disposed on two side walls of the fan-shaped spaces, and the fan-shaped spaces are formed between the two adjacent supporting plates of the three-blade long plates 9 and the inner annular wall of the round box 3. One end of the fine screw rod 11 is disposed on one end of a shaft rod of motors 2.

Furthermore, the discharging mechanism includes a slurry pump 7 and a rubber round block 19. The slurry pump 7 is communicated with a bottom of an annular surface of a round frame 6 through a connecting pipe, and a round port of the round frame 6 is sealingly disposed on an end surface edge of one end of the round box 3. The rubber round block 19 is adhered to a round surface of one side of the round plate 17, and one end of a push rod of an air cylinder 18 is disposed on a middle of another side of the round plate 17. The air cylinder 18 is disposed on a middle position of an end surface of one end of the round frame 6.

Furthermore, three butt joint holes 301 are annularly disposed on the annular surface of the round box 3 at equal intervals, and the three butt joint holes 301 and three liquid inlet pipes 4 corresponding to the three butt joint holes 301 are welded together in a sealing mode. The liquid inlet pipes 4 are conveniently to be disposed on corresponding position of the round box 3 and communicated with the round box 3. Threaded holes 21 are disposed on a middle of each fan-shaped surface of one side of the fan-shaped scraping blades 10, and sliding holes 22 are symmetrically disposed on each fan-shaped surface of one side of the fan-shaped scraping plates 10, which is convenient to install the corresponding fine screw rods 11 and guide sliding rods 12. Numbers of the motors 2 are disposed as three. The three motors are annularly disposed on an end surface edge of another end of the round box 3 at the equal intervals to achieve an effect of driving fine screw rods 11 connected with each other to rotate. A middle portion of the round tube 8 is located in the end surface of another end of the round box 3, and another end of the round tube 8 is disposed inside the assembling hole 14. The round tube 8 plays a part in connecting the three-blade long plate 9 with the cavity structure and the water pump 1. The rubber round block 19 are pasted and pressed together with the three fan-shaped holes 20 of corresponding position through the air cylinder 18, and the air cylinder 18 is connected with a built-in pneumatic controller 5 and an external air pump through a hose. The pneumatic controller 5 is disposed on the annular surface of the round frame 6, which facilitates the running air cylinder 18 to be in a compressed state to make the rubber round block 19 and the three fan-shaped holes 20 distributed annularly pressed together or separated from each other. A shape of the fan-shaped scraping plate 10 is matched with a shape of a fan-shaped structure formed by the two adjacent supporting plates of the three-blade long plate 9, the three fan-shaped spaces formed between the three-blade long plate 9 and the round box 3 are all communicated with the corresponding liquid inlet pipe 4 through the butt joint hole 301, which facilitates liquid to enter the formed fan-shaped space. An electric adjusting valve 401 is disposed on an outer end of each liquid inlet pipe 4, a water pipe disposed on the liquid inlet end of the electric adjusting valve 401 and a water pipe disposed on an liquid outlet end of the water pump 1 are all located in corresponding sewage treatment tanks, which is beneficial to suck or discharge sewage into the corresponding treatment tanks. The motors 2, the electric adjusting valve 401, and the water pump 1 and the slurry pump 7 are electrically connected with a built-in control equipment and an external power supply through conductive wires, so that an effect of controlling and performing corresponding equipment is achieved. The two guide sliding rods 12 on each fan-shaped scraping plate 10 and corresponding fine screw rods are distributed in a triangular mode, the two guide sliding rods 12 are disposed on corresponding positions between round walls of two sides inside the round box 3, which facilitates the corresponding fan-shaped scraping plate 10 connected with the guide sliding rods 12 to move stably.

During using the present disclosure, when the water pump 1 is turned on, the treatment tank is connected with the round tube 8, three-blade long plate 9 and the liquid inlet pipes 4, and water in the treatment tank is extracted and flows into the round box 3. The water entering an interior of the three-blade long plate 9 is filtered through the corresponding fine-hole filter plates 15 disposed on the surface of the three-blade long plate 9 with the cavity structure, so that impurities such as floating objects in the water are blocked by the fine-hole filter plate 15 to realize a function of filtering water in the treatment tank. Moreover, by replacing and installing fine-hole filter plates with different sizes of holes, different degrees of filter effects are achieved. Meanwhile, the filtered water can be injected into a corresponding treatment tank.

When cleaning the floating objects filtered by the fine-hole filter plates 15, the motors 2 drive the fine screw rods 11 to rotate by controlling a corresponding control device, so that corresponding surfaces of the three fan-shaped scraping plates 10 connected with each other and the steel wire bristles 13 on the corresponding surfaces are attached to surfaces of the corresponding fine-hole filter plates 15 and gradually get close to ports of the corresponding fan-shaped holes 20, which is beneficial to scrap and remove filter residue substances on the surface of a water filter structure. So that subsequent normal filter operation is ensured, and inconvenience of disassembling and cleaning filter materials is solved.

The rubber round block 19 pasted and pressed with the three fan-shaped holes 20 is driven to be far away from the fan-shaped holes 20 by making the air cylinder 18 in a contracted state, so that the scraped filter residue substances fall into the round frame 6. And the filter residue substances accumulated in the round frame 6 are discharged to corresponding stacking treatment position by running the slurry pump 7 to transporting the filter residue substances to corresponding stacking treatment position, so that the filter residue substances accumulated are treated, and an effect of conveniently processing the filter residue substances is realized.

The circuit, the electronic component, and the module are all the prior art, and can be completely realized by the technical personnel in this field. Needless to say, the protection content of the present disclosure does not relate to improvement on software and methods.

For the technical personnel in this field, it is obvious that the present disclosure is not limited to details of exemplary embodiments above. The present disclosure can be embodied in other specific forms without departing from the spirit or essential characteristics of the present disclosure. Thus, regardless of which point in view, the embodiments should be considered as exemplary, and not limiting. It is intended that the scope of the present disclosure is limited by the claims appended hereto, but not by this detailed description. Thus, all changes which come within the meaning and scope of the claims are intended to be embraced within the present disclosure. Any reference numerals in the claims should not be regarded as limiting the claims involved.

The present disclosure is as shown above, the above descriptions are only preferred embodiments of the present disclosure, and are not intended to limit the present disclosure. Although the present disclosure is described in reference to the preferred embodiments, it should be understood by those skilled in this filed, the technical scheme described in the embodiments can still be modified, or part of technical features of the technical solutions can be equivalently substituted. The modification or replacement does not make the essence of the corresponding technical solution depart from the spirit and scope of the technical solutions of the embodiments of the present disclosure.

What is claimed is:

1. A water floating object treatment device for sewage treatment, comprising:

a round box; a suction filter mechanism; a scraping mechanism; and a discharging mechanism;

wherein three ends of three liquid inlet pipes are annularly disposed on a middle of an annular surface of the round box at equal intervals; the three liquid inlet pipes are communicated with the round box, and three fan-shaped holes are annularly disposed on an end surface of one end of the round box at equal intervals;

wherein the suction filter mechanism comprises a water pump and a three-blade long plate; the water pump is disposed on a middle of an end surface of another end of the round box; and one end of a round tube is disposed on a water inlet of the water pump; the three-blade long plate is a cavity structure, and an assembling hole is disposed on a middle of one end inside the cavity structure; strip holes are disposed on two sides surfaces of each of three supporting plates of the three-blade long plate, and fine-hole filter plates are disposed inside the strip holes; and the three-blade long plate is disposed inside the round box;

wherein the scraping mechanism comprises fan-shaped scraping plates, each fan-shaped scraping plate is located in a respective fan-shaped space, the respective fan-shaped space is formed between each two adjacent supporting plates of the three-blade long plate and an inner annular wall of the round box, and fine screw rods pass through each middle portion of the fan-shaped scraping plates; two guide sliding rods pass through each of the fan-shaped scraping plates, one on either side of the middle portion; and the guide sliding rods are slidably disposed on two sides of the fan-shaped scraping plates; steel wire brush bristles are densely adhered to two side surfaces of each fan-shaped scraping plate; the fine screw rods are rotatably disposed inside the fan-shaped spaces; one end of each of the fine screw rods is disposed on one end of a shaft rod of a plurality of motors; and wherein the discharging mechanism comprises a slurry pump and a rubber round block; the slurry pump is communicated with a bottom of an annular surface of a round frame through a connecting pipe, and a round port of the round frame is sealingly disposed on an end surface edge of one end of the round box; the rubber round block is adhered to a round surface of one side of a round plate, and one end of a push rod of an air cylinder is disposed on a middle of another side of the round plate; the air cylinder is disposed on a middle position of an end surface of one end of the round frame.

2. The water floating object treatment device for sewage treatment according to claim 1, wherein three butt joint holes are annularly disposed on the annular surface of the round box at equal intervals, and the three butt joint holes and three liquid inlet pipes corresponding to the three butt joint holes are welded together in a sealing mode.

3. The water floating object treatment device for sewage treatment according to claim 1, wherein threaded holes are disposed on a middle of each fan-shaped surface of one side of the fan-shaped scraping blades, and sliding holes are symmetrically disposed on each fan-shaped surface of one side of the fan-shaped scraping plates.

4. The water floating object treatment device for sewage treatment according to claim 1, wherein a numbers of the plurality of the motors is three, and the three motors are annularly disposed on an end surface edge of the another end of the round box at equal intervals.

5. The water floating object treatment device for sewage treatment according to claim 1, wherein a middle portion of the round tube is located in the end surface of the another end of the round box, and another end of the round tube is disposed inside the assembling hole.

6. The water floating object treatment device for sewage treatment according to claim 1, wherein the rubber round block is sealingly pressed together with the three fan-shaped holes of corresponding position through the air cylinder, and the air cylinder is connected with a built-in pneumatic controller and an external air pump through a hose; the pneumatic controller is disposed on the annular surface of the round frame.

7. The water floating object treatment device for sewage treatment according to claim 1, wherein a shape of the fan-shaped scraping plate is matched with a shape of a fan-shaped structure formed by the two adjacent supporting plates of the three-blade long plate, the three fan-shaped spaces formed between the three-blade long plate and the round box are all communicated with the corresponding liquid inlet pipes through butt joint holes.

8. The water floating object treatment device for sewage treatment according to claim 1, wherein an electric adjusting valve is disposed on an outer end of each liquid inlet pipe; a water pipe disposed on a liquid inlet end of the electric adjusting valve and a water pipe disposed on aft liquid outlet end of the water pump are all located in corresponding sewage treatment tanks.

9. The water floating object treatment device for sewage treatment according to claim 8, wherein the motors, the electric adjusting valve, the water pump, and the slurry pump are electrically connected with a built-in control equipment and an external power supply through conductive wires.

10. The water floating object treatment device for sewage treatment according to claim 1, wherein connecting rods of the two guide sliding rods on each fan-shaped scraping plate and corresponding fine screw rods are distributed in a triangular mode, the two guide sliding rods are disposed on corresponding positions between round walls of two sides inside the round box.

\* \* \* \* \*